US008935209B2

(12) United States Patent
Oza

(10) Patent No.: US 8,935,209 B2
(45) Date of Patent: *Jan. 13, 2015

(54) TECHNIQUES FOR ESTABLISHING A FILE SYSTEM THAT EXPOSES A VIRTUAL FILE SYSTEM FOR BACKUP OPERATIONS

(75) Inventor: Dhairesh Oza, Bangalore (IN)

(73) Assignee: Novell, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,818

(22) Filed: Sep. 14, 2012

(65) Prior Publication Data

US 2013/0013565 A1 Jan. 10, 2013

Related U.S. Application Data

(63) Continuation of application No. 12/463,489, filed on May 11, 2009, now Pat. No. 8,285,682.

(51) Int. Cl.
*G06F 17/00* (2006.01)
*G06F 9/54* (2006.01)
*G06F 11/14* (2006.01)
*G06F 17/30* (2006.01)

(52) U.S. Cl.
CPC ............ *G06F 9/542* (2013.01); *G06F 11/1451* (2013.01); *G06F 17/30144* (2013.01); *G06F 17/30233* (2013.01); *G06F 11/1466* (2013.01)
USPC ........... 707/640; 707/800; 707/822; 707/825; 707/831; 719/318

(58) Field of Classification Search
USPC ......... 707/640, 646, 661, 800, 822, 831, 825; 719/318
See application file for complete search history.

(56) References Cited

U.S. PATENT DOCUMENTS

| | | | | |
|---|---|---|---|---|
| 5,765,165 A * | 6/1998 | Harper | ................... | 707/999.102 |
| 6,829,688 B2 | 12/2004 | Grubbs et al. | | |
| 6,983,296 B1 * | 1/2006 | Muhlestein et al. | .......... | 707/705 |
| 7,051,053 B2 | 5/2006 | Sinha | | |
| 7,246,211 B1 | 7/2007 | Beloussov et al. | | |
| 7,567,994 B2 * | 7/2009 | Adkins et al. | ............. | 707/999.2 |
| 7,603,391 B1 * | 10/2009 | Federwisch et al. | ... | 707/999.202 |
| 8,001,580 B1 * | 8/2011 | Hyer et al. | ......... | 726/2 |
| 8,099,605 B1 * | 1/2012 | Billsrom et al. | ............. | 713/187 |
| 8,195,624 B2 * | 6/2012 | Yang | ............................. | 707/687 |
| 8,229,897 B2 * | 7/2012 | Cannon et al. | ................ | 707/679 |
| 2003/0225865 A1 * | 12/2003 | Koestler | ........................ | 709/220 |
| 2004/0064488 A1 * | 4/2004 | Sinha | ............................. | 707/204 |
| 2005/0081099 A1 | 4/2005 | Chang et al. | | |
| 2005/0273858 A1 | 12/2005 | Zabok et al. | | |
| 2005/0278382 A1 * | 12/2005 | LaRocca et al. | .............. | 707/200 |
| 2005/0278383 A1 * | 12/2005 | Kazar et al. | .................... | 707/200 |
| 2007/0005661 A1 * | 1/2007 | Yang | ............................. | 707/200 |
| 2007/0079086 A1 * | 4/2007 | Wang et al. | .................... | 711/161 |
| 2007/0156789 A1 * | 7/2007 | Semerdzhiev et al. | ........ | 707/204 |
| 2007/0174353 A1 * | 7/2007 | Adkins et al. | ................. | 707/202 |
| 2007/0185934 A1 * | 8/2007 | Cannon et al. | ................. | 707/204 |
| 2009/0144422 A1 * | 6/2009 | Chatley et al. | ................ | 709/226 |
| 2009/0240737 A1 | 9/2009 | Hardisty et al. | | |
| 2009/0327357 A1 * | 12/2009 | Beglin et al. | ................... | 707/202 |
| 2010/0174745 A1 * | 7/2010 | Ryan et al. | ..................... | 707/770 |
| 2010/0287140 A1 | 11/2010 | Oza | | |
| 2013/0138618 A1 * | 5/2013 | Chatley et al. | ................ | 707/694 |

* cited by examiner

OTHER PUBLICATIONS

Wikipedia, inotify, Retrieve from the web.archive.org, Nov. 12, 2007, 3 pages.*
"Filesystem in Userspace", [Online]. Retrieved from the Internet: <http://en.wikipedia.org/wiki/Filesystem_in_Userspace> Retrieved on May 20, 2011, 3 pgs.
Kaczmarski, Michael, et al., "Beyond Backup Toward Storage Management", IBM Systems Journal 42 (2), (2003), 322-337.
Konishi, Ryusuke, et al., "The Linux Implementation of a Log-structured File System", ACM SIGOPS Operating Systems Review 40 (3), (Jul. 2006), 102-107.
Peterson, Zachary, et al., "Ext3cow: A Time-Shifting File System for Regulatory Compliance", ACM Transactions on Storage, 1 (2), (May 2005), 190-212.
Raghavan, Arun, "File System Independent Metadata Organization for TrasCrypt", Masters Thesis, Dept. of Computer Science & Engineering, Indian Institute of Technology, Kanpur, India, (Jun. 2008), 72 pgs.

*Primary Examiner* — Phong Nguyen
(74) *Attorney, Agent, or Firm* — Schwegman Lundberg & Woessner, P.A.

(57) ABSTRACT

Techniques for establishing a files system that exposes a virtual file system for backup operations are presented. Changes to files of a file system are maintained separately or collected and presented as a VFS. The VFS is then used to perform backup operations. Moreover, the files identified in the VFS can be customized based on search parameters, criterion, and/or criteria supplied by a user or supplied as parameters to backup and VFS mount operations.

11 Claims, 3 Drawing Sheets

TECHNIQUES FOR ESTABLISHING A FILE SYSTEM THAT EXPOSES A VIRTUAL FILE SYSTEM FOR BACKUP OPERATIONS

RELATED APPLICATIONS

The present application claims priority to, and is a Continuation of U.S. Ser. No. 12/463,489, filed May 11, 2009, now U.S. Pat. No. 8,285,682 entitled: "Techniques for Establishing a File System that Exposes a Virtual File System for Backup Operations," which presently stands allowed, and the disclosure of which is incorporated by reference in its entirety herein and below.

BACKGROUND

Electronic information is captured for nearly every aspect of one's life, operations of an enterprise, and affairs of governments. This information is gathered, organized, in some cases indexed, analyzed, and mined. Information drives nearly all aspects of modern life. The improvements associated with information gathering, organizing, and analyzing have been further enhanced with the advent of the Internet, the World-Wide Web (WWW), high speed network connectivity, wireless connectivity, and mobile devices that can access networks from virtually anywhere on the globe.

Essentially, information is now omnipresent and available to virtually everyone at anytime from anywhere and at a relatively low cost. These things have dramatically changed the manner in which affairs of individuals are conducted and changed the manner in which business and government operations are conducted.

One issue with data collection is storage space, high availability of data when primary storage for the data fails, and backup capabilities when storage fails to ensure that information is not lost.

In the last few years there has also been a tremendous growth in the collection of unstructured data. While file systems and disks have scaled up to store terabytes of data, backing up this data is becoming increasingly difficult. Though mirroring, snapshots, de-duplication and other upstart technologies have promised a panacea for managing this data, hardcore administrators realize that no technology exists other than a simple backup procedure that can help them against a accidental deletion of important data from a storage device. For example, a simple "rm-rf" operation in a Unix® or Linux® operating system (OS) performed by one with root privileges can literally permanently erase data in an unintended manner or in some cases based on malicious intent. So, backup solutions remain an essential yet neglected piece of the "information explosion" puzzle.

Thus, what are needed are improved techniques for providing efficient backup operations for large file systems having voluminous amounts of data being managed thereon.

SUMMARY

In various embodiments, techniques for establishing a file system that exposes a virtual file system for backup operations are presented. More specifically, and in an embodiment, a method is provided for establishing a file system that exposes a virtual file system for backup operations.

DETAILED DESCRIPTION

As used herein a "resource" is an addressable and uniquely distinguishable entity, which is represented within a network, such as but not limited to, a user, a service, a group, a printer, a server, a website, a file, a directory, a domain, a device, custom-defined objects, etc.

Various aspects of this invention discuss usage of a "file system (FS)" A "FS" is an interface and set of management modules that allow data to be stored on, organized on, and retrieved from physical storage. So, a FS may be viewed as a special-purpose database for the storage, organization, manipulation, and retrieval of data (such as files).

A "virtual file system (VFS)" is an abstraction layered on top of a physical FS that permits applications to access different types of concrete FS's in a concrete and uniform manner. So, a VFS can be used as a single addressable interface that bridges different FS's, such as Windows®, Linux®, Macintosh®, etc.

File System in User Space (FUSE) is a loadable kernel module in a Unix®-like operating system (OS) that allows non-privileged users to create their own custom FS's without having to edit or modify the kernel code of the OS. A FUSE module acts as a higher-level bridge to the underlying kernel interfaces of the OS. Thus, FUSE modules permit creation and maintenance of VFS's. Any resource available to a FUSE implementation can be exported as its own FS.

According to an embodiment, the techniques presented herein are implemented in FS's and OS's. In an embodiment, the OS is Linux®, such as Suse® Linux®, distributed by Novell®, Inc. of Provo, Utah.

Of course, the embodiments of the invention can be implemented in a variety of architectural platforms and products. Any particular architectural layout, product, or implementation presented herein is provided for purposes of illustration and comprehension only and is not intended to limit various aspects of the invention.

It is within this initial context, that various embodiments of the invention are now presented with reference to the FIGS. 1-4.

Figure 1:
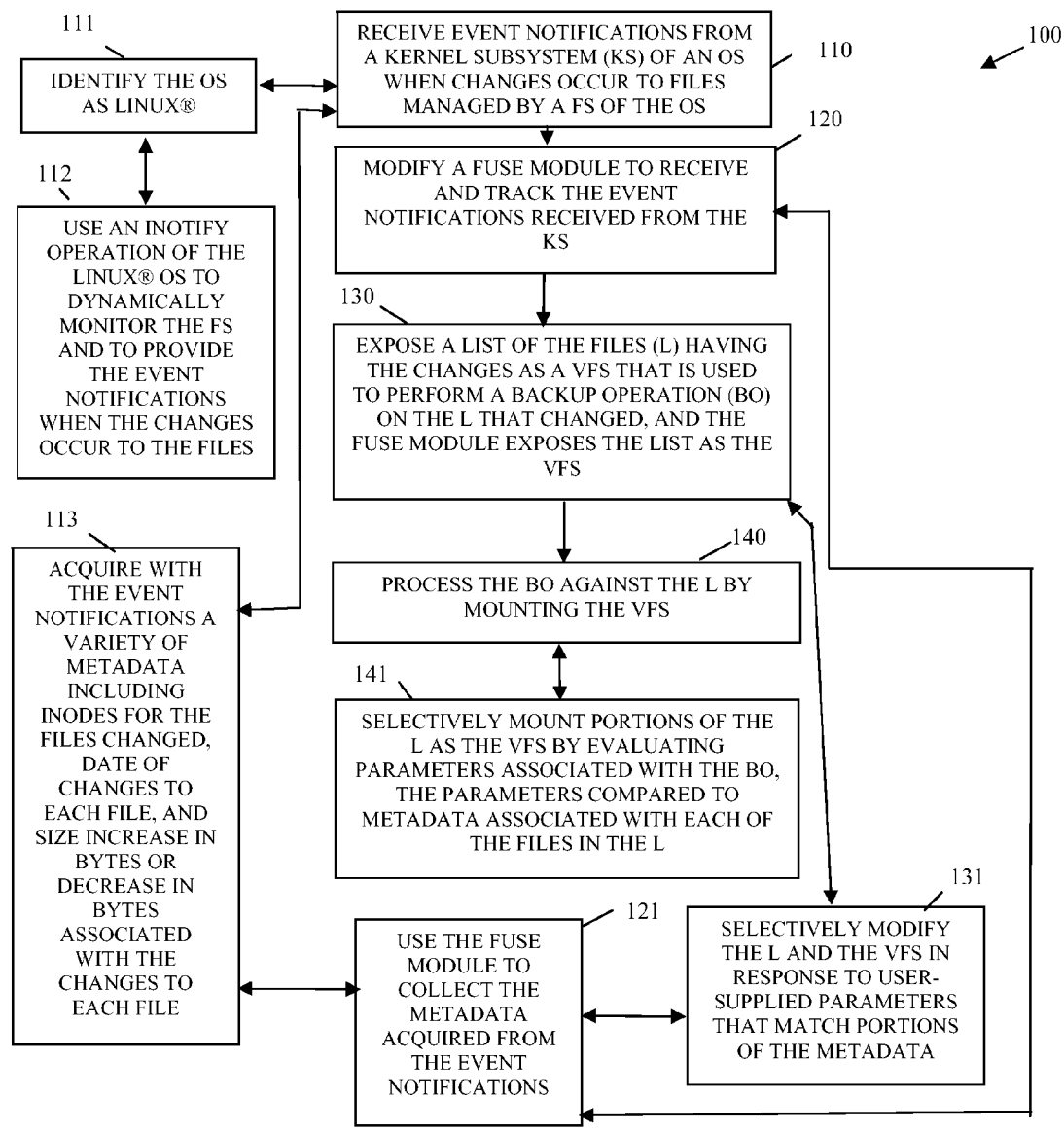
FIG. 1 is a diagram of a method that is provided for establishing a file system that exposes a virtual file system for backup operations, according to an example embodiment.

FIG. 1 is a diagram of a method 100 that is provided for establishing a file system (FS) that exposes a virtual file system (VFS) for backup operations, according to an example embodiment. The method 100 (hereinafter "custom FS service") is implemented as instructions in a machine-accessible and computer-readable storage medium. The instructions when executed by one or more network-based machines (processing devices, processors, computers, etc.) perform the processing depicted in FIG. 1. The custom FS service is also operational over and processes within a network. The network may be wired, wireless, or a combination of wired and wireless.

At 110, the custom FS service receives event notifications from a kernel subsystem of an OS when changes occur to files managed by a FS of the OS. These changes can be to primary data or content associated with the files or to metadata associated with the files. Some metadata changes might include such things as changes in security to the files, changes in ownership with the files, changes to name descriptors to the files, etc. In some cases, changes can be associated with both primary data and metadata.

According to an embodiment, at 111, the custom FS service identifies the OS as a Linux® OS. The Linux® OS includes a variety of beneficial modules that make receiving custom event notifications easier to achieve.

For example, at 112, the custom FS service can use an inotify operation of the Linux® OS to dynamically monitor the FS and to provide the event notifications when the changes occur to the files.

In another case, at 113, the custom FS service acquires with the event notifications a variety of metadata. Some of this metadata can include inodes (OS identifiers) for the files changed, date of changes to each file, time-of-day changes to each file, size increase in bytes, and/or size decrease in bytes associated with changes to each file. It is noted that the event notifications may just provide the notification that a change occurred and the custom FS service can query inodes for each of the changed files to get the metadata. In other cases, the event notifications include all the metadata. What metadata is tracked and acquired can be customized and can be defined via a configuration of the custom FS service or via parameters to the custom FS service. The type of metadata can also be custom defined via a profile or policy associated with the custom FS service.

At 120, the custom FS service modifies a FUSE module to receive and track the event notifications received from the kernel subsystem. That is, the custom FS service listens for the event notifications emanating from the OS and the kernel subsystem and collects these changes via a modified and enhanced FUSE module configured to collect these changes.

In an embodiment, at 121, the custom FS service uses the FUSE module to collect the metadata acquired from the event notifications. The metadata identified and acquired at 113.

At 130, the custom FS service exposes a list of the files having the changes as a VFS that is used to perform a backup operation on the list that changed. The FUSE module exposes the list as the VFS. The FUSE module has abstracted a subset of the underlying FS of the OS as its own VFS represented by just those files that have changed since a last backup operation or since some predefined custom provided date.

According to an embodiment, at 131, the custom FS service selectively modifies the list and the VFS in response to user-supplied parameters that match portions of the metadata, again the metadata supplied and acquired at 113 and 121. So, custom queries or parameters can be used to modify the list of files that comprise the VFS and that will be used with the backup operation.

In an embodiment, at 140, the custom FS service processes the backup operation against the list by mounting the VFS having just those files that have changed since a last backup operation or since some predefined date.

Continuing with the embodiment at 140 and at 141, the custom FS service selectively mounts portions of the list as the VFS evaluates parameters associated with the backup operation. The parameters are compared to metadata associated with each of the files in the list. So, parameters or queries against the list can be used to mount the VFS as a selective portion of files that are included in the list.

For example, consider the operation "mount-t backupfs/dev/sdal-o begindate='17-04-2008'/mnt." Here, the VFS is mounted for a backup operation "backupfs" to "/mnt" and just files and directories that have been modified since the 17 of Apr. 2008 are included in the mounted VFS.

In another example, consider the operation "mount-t backupfs/dev/sdal-o begindate='last'/mnt." Here, the VFS is mounted for a backup operation "backupfs" to "/mnt" and just files and directories that have been modified since a last mount or last backup operation are included in the VFS.

The approach of using a FUSE module is presented with the custom FS service of the FIG. 1. Another approach can be used as well to establish a FS that exposes a VFS for a backup operation. Such an alternative approach is now shown in the discussion of the method 200 of the FIG. 2.

Figure 2:
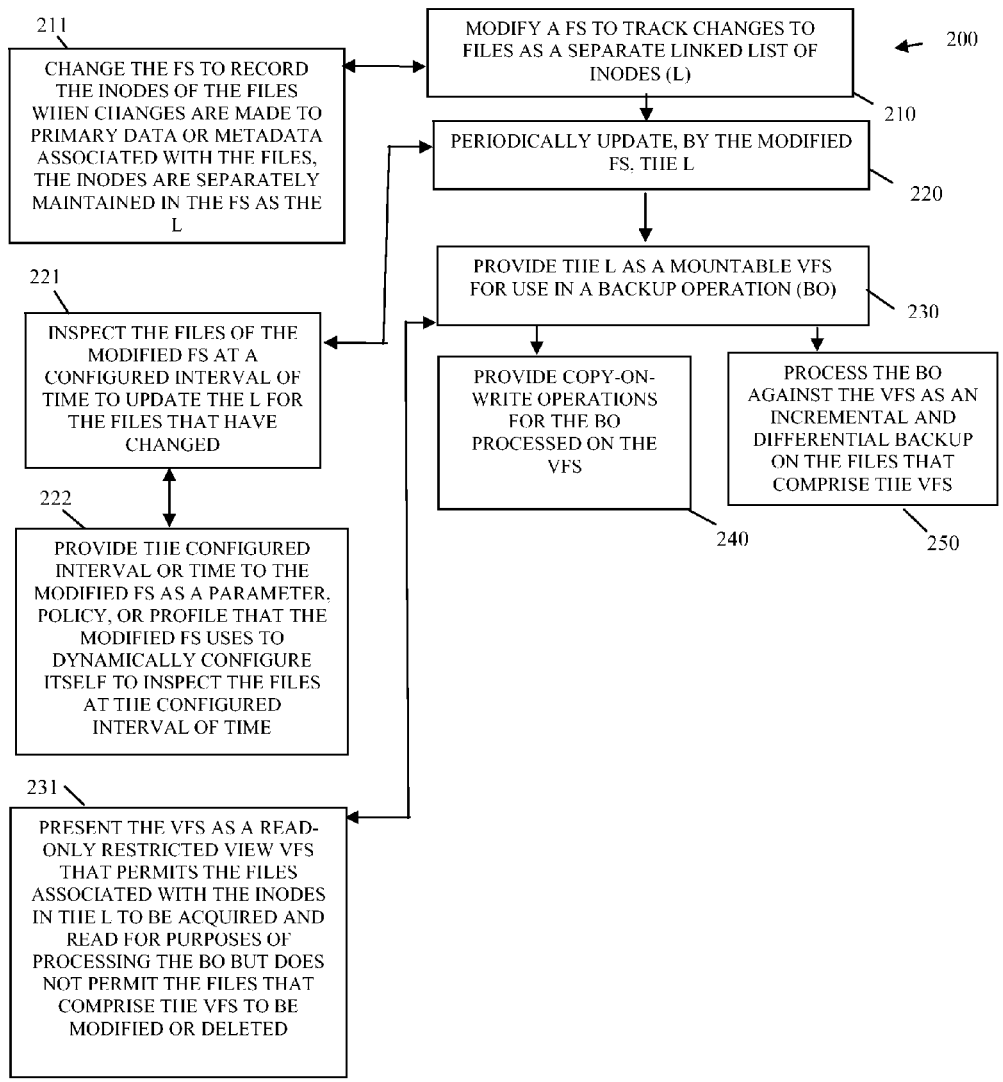
FIG. 2 is a diagram of another method for establishing a file system that exposes a virtual file system for backup operations, according to an example embodiment.

FIG. 2 is a diagram of another method 200 for establishing a FS that exposes a VFS for backup operations, according to an example embodiment. The method 200 (herein after referred to as "VFS backup operation service") is implemented in a machine-accessible and computer-readable storage medium as instructions, which when accessed by one or more machines (processors, etc.) perform the processing depicted in the FIG. 2; the VFS backup operation service is also operational over a network; and the network may be wired, wireless, or a combination of wired and wireless.

The VFS backup operation service presents an alternative approach from that which was discussed with the custom FS service represented by the method 100 of the FIG. 1 and discussed above.

At 210, the VFS backup operation service modifies and configures a file system of an OS to track changes to files as a separate linked list of inodes. That is, an existing file system is modified and enhanced and configured to record changes that occur to files managed by the FS as a linked list of inode references that are separately maintained within the FS.

According to an embodiment, at 211, the VFS backup operation service changes the FS to record the inodes of the files when changes are made to primary data or metadata associated with the files. Again, the inodes are separately maintained in the file system as the linked list of inodes. Metadata can also be carried with the inodes that indicates when the files were changed, what changes in size occurred to the files, who made the changes, etc. The types of metadata that can be maintained with the inodes in the list can be configured as configuration parameters to the VFS backup operation service.

At 220, the VFS backup operation service periodically updates, via the modified FS, the linked list of inodes. That is, the modified FS periodically scans the FS for changes and updates the inodes to the linked list of inodes.

For example, at 221, the VFS backup operation service inspects files of the modified FS at a configured interval of time to update the linked list of inodes for the files that have changed since a last inspected interval. The inspection is achieved via the modified FS.

Continuing with the embodiment at 221 and at 222, the VFS backup operation service provides the configured interval of time as a parameter, a policy, or a profile that the modified FS uses to dynamically configure itself for purposes of inspecting the files of the FS at the configured interval of time.

At 230, the VFS backup operation service provides the linked list of inodes as a mountable VFS for use in a backup operation. So, the linked list of inodes becomes a higher level abstraction that can be manipulated as its own independent and separate VFS. That VFS includes just inode references to files that have changes since a last backup operation or since some parameter provided criterion or criteria that can be used as a search to narrow the linked list of inodes down to a list needed for a backup operation.

According to an embodiment, at 231, the VFS backup operation service presents the VFS as a read-only restricted view VFS that permits the files associated with the inodes of the list to be acquired and read for purposes of processing the backup operation but does not permit the files that comprise the VFS to be modified or deleted. This is a read only view useful and efficient for the backup operation against the inodes of the list.

In another situation, at 240, the VFS backup operation service provides copy-on-write operations for the backup operation processed on the VFS.

In another case, at 250, the VFS backup operation service processes the backup operation against the VFS as an incremental and differential backup on the files that comprise the VFS. So, the backup can be a full backup operation that writes the entire file that changed or can be a backup that just records differences that were made such that the changes can be reconstructed using the original file and applying a series of incremental changes recorded in the backup.

The method 100 demonstrated how a file system is established to expose a VFS for performing more efficient backup operations on changed files by using a FUSE module to create the VFS and using notifications that emanate from the OS. The method 200 demonstrated how the same result can be achieved via modifications and enhancements to a FS to have it maintain inodes in a linked list that is then presented as a VFS for backup operations.

Figure 3:
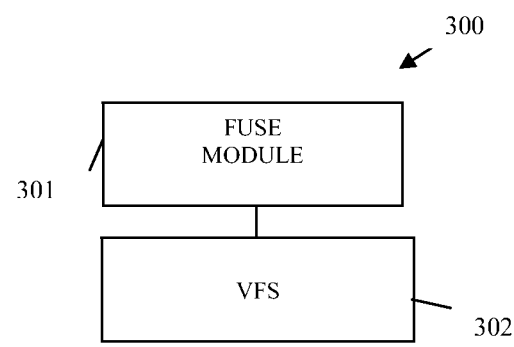
FIG. 3 is a diagram of a backup operation file system, according to an example embodiment.

FIG. 3 is a diagram of a backup operation file system 300, according to an example embodiment. The backup operation file system 300 is implemented in a machine-accessible and computer-readable storage medium as instructions, which when executed by one or more machines (computers or processor-enabled devices) perform, among other things, the processing depicted in the method 100 of the FIG. 1. The backup operation file system 300 is also operational over a network; the network may be wired, wireless, or a combination of wired and wireless.

The backup operation file system 300 includes FUSE module 301 and a VFS 302. Each of these components and their interactions with one another will now be discussed in turn.

The FUSE module 301 is implemented in a computer-readable storage medium and to execute on a processor and within an operating system (OS) of that processor. Example aspects of the FUSE module 301 were presented in detail above with respect to method 100 of the FIG. 1.

The FUSE module 301 receives kernel notifications from the OS when changes occur to files being managed by a FS of the OS. The FUSE module 301 collects these files and presents them as the VFS 302.

According to an embodiment the OS is a Linux® OS. Although it is noted that any OS can be used with the teachings presented herein. When the OS is a Linux® OS, then the FUSE module 301 receives the kernel notifications from an inotify operation of the Linux® OS.

In another case, the FUSE module 301 collects metadata with the files that have changed. The metadata includes inodes for the files, dates for changes made to the files, time-of-day changes made to the files, size increases and size decreases for changes made to the files, etc.

Continuing with the previous embodiment and in another case, the FUSE module 301 collects the metadata and files that changed as a list and then modifies the list in response to user-supplied parameters that match portions of the metadata. Example situations of this were presented above with reference to the method 100 of the FIG. 1.

The VFS 302 is implemented in a computer-readable storage medium and executes on the processor. Example aspects of the VFS 302 were presented above with reference to the methods 100 and 200 of the FIGS. 1 and 2, respectively.

The VFS 302 is used to process a backup operation against the files that comprise the VFS 302. In this way, more efficient backup operations are achieved because the changed files are already maintained and known and the underlying physical FS does not have to be queried and inspected. Moreover, the VFS 302 acts as a unit and logical FS that includes all the files that are to be backed up by the backup operation. This is more processor efficient that conventional backup approaches.

In an embodiment, the VFS 302 is mounted with the files within the OS before the backup operation is processed on the files that changed.

Figure 4:
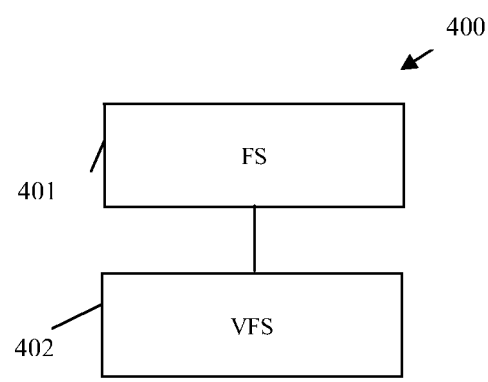
FIG. 4 is a diagram of another backup operation file system, according to an example embodiment.

FIG. 4 is a diagram of another backup operation file system 400, according to an example embodiment. The backup operation file system 400 is implemented as instructions on or within a machine-accessible and computer-readable storage medium. The instructions when executed by one or more machines (processor-enabled devices) perform, inter alia; the processing depicted with respect to the method 200 of the FIG. 2. The backup operation file system 400 is also operational over a network and the network may be wired, wireless, or a combination of wired and wireless.

The backup operation file system 400 is an alternative approach to exposing a VFS for backup operations from that which was presented above with respect to the backup operation file system 300 represented by the FIG. 3 and presented above.

The backup operation file system 400 includes a FS 401 and a VFS 402. Each of these components and their interactions with one another will now be discussed in turn.

The FS 401 is implemented in a computer-readable storage medium and executes on a processor. Example aspects of the FS 401 were presented in detail above with respect to the method 200 of the FIG. 2.

The FS 401 dynamically maintains a linked list of inodes for files that have been changed since a last recorded event within an OS. The FS 401 exposes the linked list of inodes as the VFS 401.

According to an embodiment, the FS 401 inspects the files of the OS at a configured interval to update the linked list of inodes.

In another case, the FS 401 exposes the linked list as a read-only restricted view within the VFS 402 that does not permit modification or deletion to the files that are represented by the inodes of the VFS 402.

The VFS 402 is implemented in a computer-readable storage medium and executes on the processor. Example aspects of the VFS 402 were presented in detail above with reference to the method 200 of the FIG. 2.

The VFS 402 is used to process a backup operation to efficiently backup the files associated with the inodes that are defined in the VFS 402.

One now appreciates how backup operations can be more efficiently achieved by dynamically tracking changes to files and then exposing just those changed files as a mountable VFS for which the backup operation is processed against.

It is also noted that the techniques presented herein can also be used in database contexts. For example, dynamically changes can be tracked for database tables and then the changes can be exposed as a logical unit within a virtual database. This could also provide for more efficient database backup operations and update operations in some situations.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory computer-readable storage medium as executable instructions that process on one or more processors to perform the method, comprising:

exposing, by the processors, a list of the files having changes in a file system as an independent Virtual File System (VFS) that is used to perform a backup operation on the list of files that changed, the VFS used as a single addressable interface that bridges different file systems, wherein exposing further includes detecting event notifications at a kernel level of the OS for each of the changes, wherein detecting further includes using a File System in User Space (FUSE) module to track the event notifications from the kernel level; and acquire, by the processors, metadata by querying inodes for the files, the metadata including data changes of each file and an increase or decrease in file size for each file after the changes.

2. The method of claim 1, wherein using further includes acquiring the VFS from the FUSE module.

3. The method of claim 1, wherein exposing further includes identifying some of the changes to some of the files as one or more changes to: security, ownership, and name descriptors.

4. The method of claim 1, wherein exposing further includes identifying some of the changes to some of the files as one or more changes to primary data associated with those files.

5. The method of claim 1, wherein exposing further includes identifying some of the changes to some of the files as specific changes to specific metadata associated with those files and primary data associated with those files.

6. The method of claim 1, wherein exposing further includes selectively modifying the VFS.

7. The method of claim 1 further comprising, backing up, by the processors, the list by mounting the VFS.

8. A method implemented in a non-transitory computer-readable storage medium as executable instructions that process on one or more processors to perform the method, comprising:

modifying, by the processors, a file system (FS) to track changes to files as a separate linked list of inodes that form a virtual file system (VFS) that is mounted as a separate file system, and obtaining the changes by querying the files;

backing up, by the processors, the VFS incrementally and differentially for the linked list of inodes; and providing, by the processors, copy-on-write operations for the backup operation processed on the VFS inodes.

9. The method of claim 8 further comprising, regularly receiving, by the processors, updates to the linked list of inodes from the FS.

10. The method of claim 8, wherein modifying further includes configuring the FS to track the changes as modifications to metadata for the files or as modifications to primary data for the files.

11. The method of claim 8, wherein backing up further includes presenting the VFS as a read-only restricted view VFS.

* * * * *